UNITED STATES PATENT OFFICE.

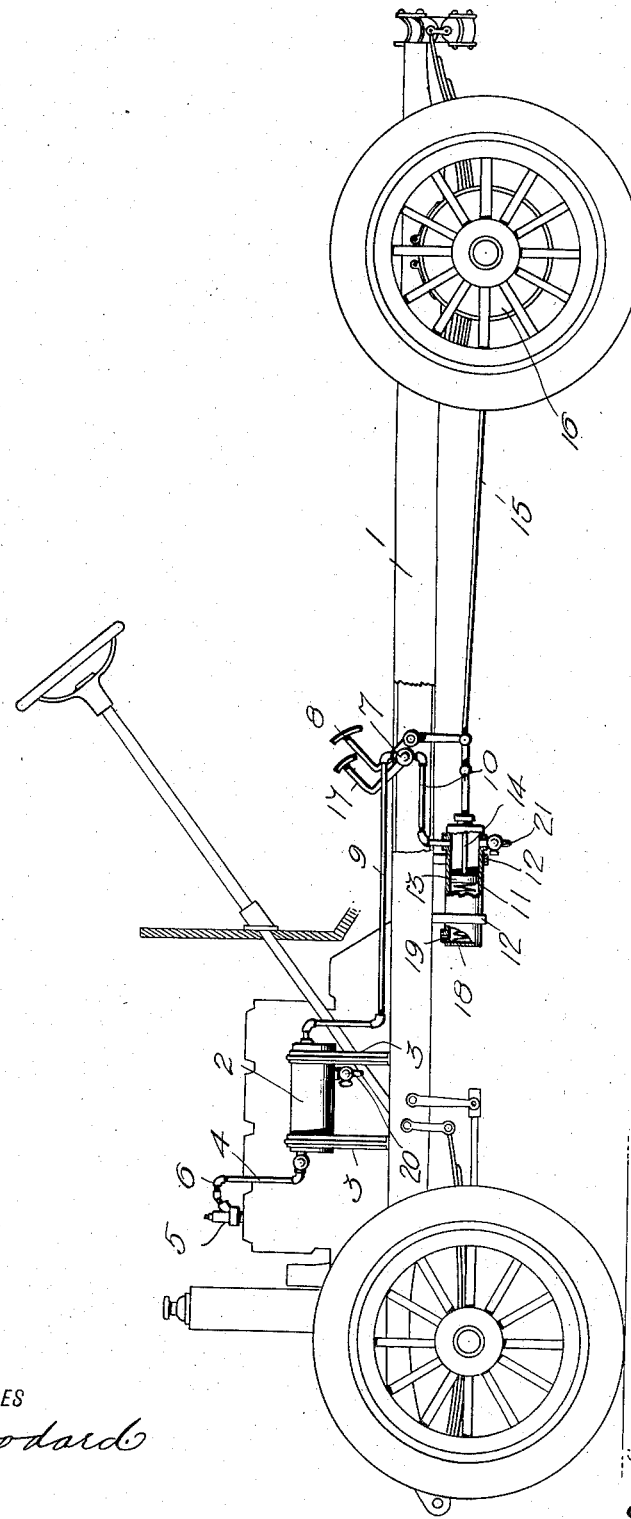

JAMES ABLE, OF NASHVILLE, TENNESSEE.

BRAKE FOR MOTOR-VEHICLES.

1,300,209.

Specification of Letters Patent.    Patented Apr. 8, 1919.

Application filed March 11, 1918.   Serial No. 221,739.

*To all whom it may concern:*

Be it known that I, JAMES ABLE, a citizen of the United States, and a resident of Nashville, in the county of Davidson and State of Tennessee, have invented certain new and useful Improvements in Brakes for Motor-Vehicles, of which the following is a specification.

My invention is an improvement in brakes for motor vehicles, and has for its object to provide a brake operated upon the same principle as the air brake, wherein a compression cylinder is provided and a storage tank, the storage tank being connected to the cylinders to cause the engine to store pressure in the tank, and wherein the brake may be controlled by any suitable means.

In the drawing is shown a diagrammatic side view of a motor vehicle provided with the improved brake.

In the present embodiment of the invention the brake is shown in connection with a motor vehicle 1, a storage tank 2 being provided which is supported from the frame of the motor vehicle by suitable supporting brackets 3. The tank 2 is connected, in the present instance, with the priming valve 5 of one cylinder or more, as may be desired, by means of a pipe 4, a check valve, indicated at 6, being interposed in the pipe to prevent the escape of pressure from the brake cylinder.

An air valve 7 is arranged adjacent to the pedal 8 of the foot brake, and a pipe 9 connects the casing of the valve with the storage tank 2. Another pipe 10 connects the valve with the brake cylinder 11, which is supported below the frame of the vehicle by suitable hangers 12.

A piston 13 is arranged within the cylinder 11, and the rod 14 of this piston is connected by a link 15 with the usual brake mechanism, indicated at 16, of the vehicle. A pedal 17 is provided for operating the valve 7, and by means of the pedal the cylinder 11 may be connected with the tank 2.

A coil spring 18 is arranged within the cylinder 11, between the piston and that end of the cylinder remote from the brake, and the said cylinder has also a vent opening 19 at the said end. The tank 2 has a sediment basin and drain valve 20, and the cylinder 11 has a similar basin and valve 21. The pedal 8 is connected to the piston rod 14 by a lost motion or sliding connection in order that the brake may be operated by the pedal 8 without interference from the cylinder 11 and associated parts.

In operation, the gas is driven into the tank 2 by the action of the pistons in the cylinders of the engine, and the compression so created is held by the check valve 6 ready for operating the brake when the valve 7 is operated by the pedal 17. When this pedal is depressed the valve is opened to place the cylinder 11 in communication with the tank 2, and the piston is moved toward the brake mechanism, firmly setting the same.

As long as the valve remains open the brakes will remain set, and to release the brakes it is only necessary to close the valve. This closing of the valve connects the cylinder 11 with the atmosphere. The spring 18 now releases the brake mechanism. The lost motion connection between the pedal 8 and the piston rod permits the pedal 8 to operate the brake without interference from the piston.

It will be understood that it is the explosion that drives a portion of the gases of combustion into the storage tank, and it is these gases that are utilized to operate the brake.

I claim:

In a motor vehicle, the combination with the engine and the brake mechanism, of a tank or reservoir, a pipe connecting the said tank to one of the cylinders of the engine, said pipe carrying a check valve, a priming valve for connecting the said pipe to the cylinder, a brake cylinder, a piston in the cylinder connected with the brake operating cylinder for operating the same, and a valved connection between the storage tank or reservoir and one end of the brake cylinder for moving the piston in a direction to operate the brake, a spring being arranged between the piston and the other end of the cylinder for releasing the brake.

JAMES ABLE.